Nov. 14, 1950
C. W. GINTER
2,529,685
LUBRICATING DEVICE
Filed May 27, 1946
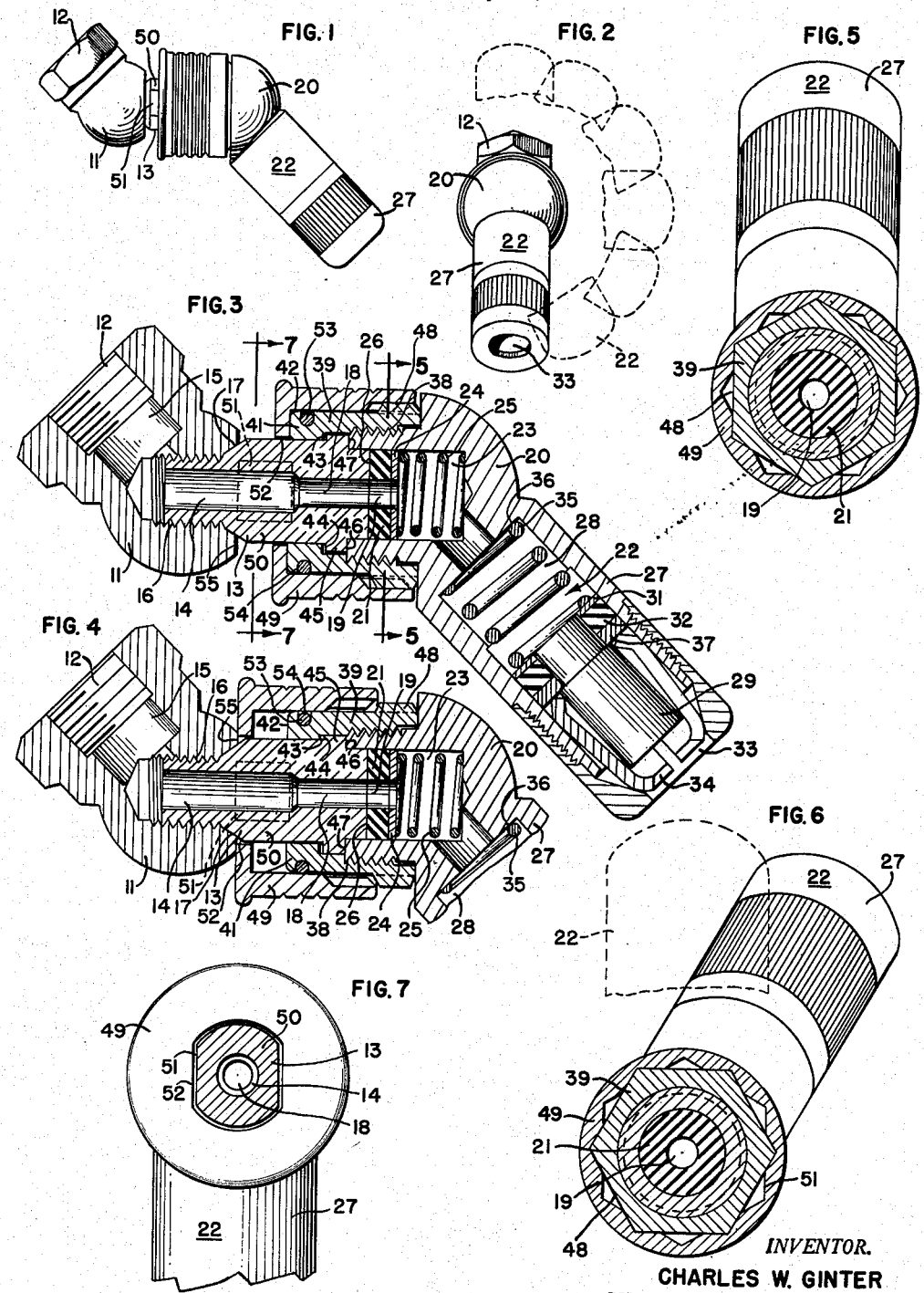
INVENTOR.
CHARLES W. GINTER
BY Bair & Freeman
ATTORNEYS Patented Nov. 14, 1950

2,529,685

UNITED STATES PATENT OFFICE 2,529,685

LUBRICATING DEVICE

Charles W. Ginter, Bryan, Ohio, assignor to The Aro Equipment Corporation, Bryan, Ohio, a corporation of Ohio Application May 27, 1946, Serial No. 672,599

9 Claims. (Cl. 285—96.1)

This invention relates to a lubricating device and particularly to lubricant discharge nozzles or couplers which may be adjusted angularly and locked in position.

Heretofore, angularly adjustable couplings for lubricating devices have been provided with a releasing mechanism which protruded from the side of the coupling. The purpose of providing an angularly adjustable coupling is to reach fittings which are frequently so located that access thereto is rendered difficult by parts of the machine, it being sometimes impossible to reach the fitting with a straight nozzle or coupling. However, with the aforesaid protruding releasing device, it was ofttimes difficult or impossible to reach the fitting even though the coupling was adjustable angularly.

It is, therefore, an important object of the invention to provide an angularly adjustable lubricant coupling or nozzle which is free of protruding parts.

It is also an object of the invention to provide an angularly adjustable lubricant coupling or nozzle in which the mechanism for releasing and the locking mechanism for locking the coupling or nozzle in various positions is contained entirely within the confines of the coupling or nozzle.

It is another object of the invention to provide an angularly adjustable lubricant coupling or nozzle which is free to swivel or is locked in any of a number of angular positions, depending upon the wishes of the operator.

It is still another object of the invention to provide an angularly adjustable lubricant coupling or nozzle which does not automatically return to the locked position when moved to a swivelling position but, rather, requires intentional re-locking by the operator when desired.

It is another object of the invention to provide a releasing device of the character described wherein the movable parts are always tightly retained in their proper relationship.

It is a further object of the invention to provide a large number of angular adjustments for a lubricating nozzle.

Still another object of the invention is to simplify the angularly adjustable lubricant coupling and the releasing and locking mechanism therefor.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a plan view of the novel lubricant coupling embodying one form of the invention;

Figure 2 is a top view of the coupling shown in Figure 1, the dotted lines indicating the various positions of adjustment on one side of the device;

Figure 3 is a vertical sectional view of the lubricating coupling shown in Figure 1, with the parts thereof in the locked position;

Figure 4 is a partial sectional view similar to Figure 3, with the parts of the coupling shown in the released position;

Figure 5 is a sectional view taken on line 5—5 of Figure 3;

Figure 6 is a view similar to Figure 5, showing the coupling adjusted angularly to a different position; and Figure 7 is a sectional view taken on line 7—7 of Figure 3.

Referring specifically to the drawing for a detained description of the invention, the coupling comprises a rigid conduit member 11 formed at one end with a threaded coupling 12 for attachment to any type of lubricant dispenser, either of the high or low pressure type. The conduit member 11 is connected at its inner end to a plunger 13 having a passage 14 centrally thereof communicating with a passage 15 in the threaded rigid conduit 11. The rigid conduit 11 and plunger 13 are preferably secured together by cooperating threads 16, a beveled surface 17 on the plunger 13 providing a stop for the coupling member 11.

The passage 14 in plunger 13 is reduced at 18 and communicates with a passage 19 in a resilient gasket 21 with a passage 23 in a swivel member 20 of an angularly adjustable speed coupling, generally indicated at 22. The resilient gasket 19 is held in position by a plate 24 pressed by a coil spring 25 against a transverse end wall 26 of plunger 13.

The passage 23 in swivel member 20 communicates with a cylindrical member 27 disposed at an angle of approximately 45° from the horizontal axis of the plunger 13 and swivel member 20 so that, when the swivel member 20 is swung about its axis in the manner hereinafter described, a large number of positions are obtainable, as shown in Figure 2. The cylindrical member 27 has a passage 28 therein communicating with a hollow bushing 29 extending through a plate 31 and a resilient gasket 32. The cylindrical member 27 is open at 33 for the reception of a lubricating fitting (not shown) which is held against the hollow bushing 29 by jaws 34, thus placing the passage 28 in communication with the fitting. Lubricant, therefore, may pass freely from the threaded inlet 12 to the fitting. A coil spring 35 engages a shoulder 36 in passage 28 and forces the plate 31 against gasket 32, an apertured transverse wall 37 in the cylindrical member 27 engaging the opposite side of gasket 32.

The internal construction of the speed coupling member 22 is covered by the patent to Nielson No. 2,263,850, assigned to The Aro Equipment Corporation.

In accordance with the present invention, the swivel portion 20 of the speed coupling is secured by cooperating threads 38 to a sleeve member 39 encompassing the plunger 13 and having an annular flanged portion 41 which provides shoulders 42 and 43 thereon. The shoulder 43 engages with one side 44 of an abutment 45 on the plunger 13. A shoulder 46 on the threaded portion of the swivel member 20 engages with an opposite side 47 of abutment 45.

The end of the sleeve member 39 adjacent swivel 20 is provided with an angular or serrated surface 48 shown herein as hexagonal in shape. A slidable cup-shaped member 49 encompasses the sleeve member 39 and plunger 13 and is provided at the end thereof adjacent the swivel 20 with a serrated surface 51, shown herein as consisting of twelve notches, which cooperates or meshes with the hexagonal surface 48 on sleeve member 39 to prevent turning of the speed coupling 22 when these surfaces are in engagement.

End 50 of the plunger 13 adjacent the threaded coupling 12 is not completely circular in cross section, but is provided with flat surfaces 51. The cup-shaped member 49 is provided with an aperture 52 in the bottom thereof, through which the plunger 13 slidably extends, and said aperture 52 is shaped to conform to the end 50 of the plunger.

A resilient snap ring 53 is retained in a recess 54 in the sleeve 39 and frictionally engages the inner surface of the cup-shaped member 49. A shoulder 55 on inlet coupling 12 engages the cup-shaped member 49 as shown in Figure 4 to limit the relative movement of plunger 13 and its associated movable parts with respect to sleeve 49.

Operation

After the inlet coupling 11 has been secured to a source of lubricant under pressure, the speed coupling 22 may be swung to any of twelve angular positions in the following manner, it being understood that this number of positions is used by way of example.

The operator moves the sleeve 49 to the left, as shown in Figure 4, thus withdrawing the teeth 51 from the teeth 48. The shoulder 55 then abuts against member 49 and prevents further movement of the parts.

It is then possible to rotate coupling member 22 and sleeve 39 to any desired position, after which the sleeve 49 is forced to the right in the drawings and the parts again engage, as shown, for example, in Figures 3 and 6. The flat portions 51 of plunger 13 prevent the cup-shaped member 49 from rotating with sleeve 39. The resilient snap ring 53 provides sufficient frictional resistance to prevent unintentional relative movement between sleeve 39 and cup-shaped member 49.

It will be noted that when the sleeve 49 is moved to the left, it will stay in that position until deliberately changed, because of the frictional engagement of ring 53 with sleeve 49. Therefore, the teeth 48 and 51 are disengaged and the member 20 is free to swivel in any direction. If the operator wishes to lock the member 20, then the sleeve 49 is moved to engage the teeth 48 and 51. So far as I am aware, all prior adjustable lubricant couplers were automatically returned to the locked position when released by the operator, usually by a spring, and free swivelling was impossible.

From the foregoing it will be apparent that the coupling has no protruding parts to prevent access to the lubricant fittings, and that the release and locking portions of the angular adjustment are contained entirely within the confines of the coupling body.

Some changes may be made in the construction and arrangement of the parts of my lubricating device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A lubricant discharge nozzle comprising, a conduit member, a nozzle member, means forming a swivel connection between said members, whereby their angular relationship may be changed, a series of locking teeth associated with and rotatable by said nozzle member, said swivel connecting means including a member encompassing said locking teeth, a series of cooperating locking teeth adapted to engage the first mentioned locking teeth and associated with said encompassing member interiorly thereof, means affording relative sliding movement of said encompassing member on said nozzle member to engage and disengage said teeth to afford relative rotation of said nozzle member with respect to said encompassing member when said teeth are disengaged, and frictional means interposed between said encompassing and nozzle members tending to oppose but affording said sliding movement, said means affording said relative sliding movement and said frictional means being wholly contained within the circumferential confines of said encompassing member.

2. A lubricant discharge nozzle comprising a conduit member having a lubricant passage therein, a nozzle member, a lubricant passage therethrough, a portion of said nozzle member being angularly disposed with respect to said inlet member, means forming a swivel connection between said members, whereby their angular relationship may be changed, a cup-shaped encompassing member having side and bottom walls, said conduit member extending through the bottom wall of said encompassing member, means preventing relative rotational movement of said encompassing member on said conduit member, said nozzle member including a sleeve portion normally surrounding said conduit member and enclosed by said encompassing member, and means preventing relative longitudinal movement between said sleeve and said conduit member but affording relative rotational movement therebetween.

3. A lubricant discharge nozzle comprising a conduit member having a passage therein for lubricant, a nozzle member having a lubricant passage therethrough, a portion of said nozzle member being angularly disposed with respect to said inlet conduit, means forming a swivel connection between said members, whereby their angular relationship may be changed, a cup-shaped encompassing member having bottom and side walls, a plurality of notches disposed interiorly of said side walls, said conduit member extending through said bottom wall, means preventing relative rotational movement of said conduit member and encompassing member, said nozzle member including a sleeve portion surrounding said conduit member, notches on the exterior surface of said sleeve member adapted to engage with and disengage from said notches on the encompassing member, said notches being disengageable by moving said encompassing member relative to said conduit member, said notches being again engaged by opposite longitudinal movement of said encompassing member.

4. A lubricant discharge nozzle comprising a conduit member having a passage therein for lubricant, a nozzle member having a lubricant passage therethrough, a portion of said nozzle member being angularly disposed with respect to said inlet conduit, a cup-shaped encompassing member having bottom and side walls, a plurality of notches disposed interiorly of said side walls, said conduit member extending through said bottom wall, means preventing relative rotational movement of said encompassing member upon said conduit member, said nozzle member including a sleeve portion surrounding said conduit member, notches on the exterior surface of said sleeve member adapted to engage with and disengage from said notches on the encompassing member, means preventing relative longitudinal movement between said sleeve and said conduit member, said last means affording relative rotational movement between said sleeve and said conduit member, whereby the angular relationship between the nozzle member and the conduit member may be changed, said notches being disengageable by moving said encompassing member longitudinally relative to said conduit member, said notches being again engaged by opposite longitudinal movement of said encompassing member, and means for limiting the longitudinal movement of said encompassing member, relative to said conduit member.

5. A lubricant discharge nozzle comprising a conduit member having a passage therein for lubricant, a nozzle member having a lubricant passage therethrough, a portion of said nozzle member being angularly disposed with respect to said conduit member, means forming a swivel connection between said members, whereby their angular relationship may be changed, a cup-shaped encompassing member having bottom and side walls, a plurality of notches disposed interiorly of said side walls, said conduit member extending through said bottom wall, means preventing relative rotational movement of said encompassing member upon said conduit member, said nozzle member including a sleeve portion surrounding said conduit member, notches on the exterior surface of said sleeve member adapted to engage with and disengage from said notches on the encompassing member, means preventing relative longitudinal movement between said sleeve and said conduit member but affording relative rotational movement therebetween, said notches being disengageable by moving said encompassing member longitudinally relative to said conduit member, said notches being again engaged by opposite longitudinal movement of said encompassing member, and spring pressed frictional means tending to prevent said longitudinal movement.

6. A lubricant discharge nozzle comprising a conduit member having a passage therein for lubricant, a nozzle member having a lubricant passage therethrough, a portion of said nozzle member being angularly disposed with respect to said inlet conduit, means forming a swivel connection between said members, whereby their angular relationship may be changed, a cup-shaped encompassing member having bottom and side walls, a plurality of notches disposed interiorly of said side walls, said conduit member extending through said bottom wall, means preventing relative rotational movement of said encompassing member upon said conduit member, said nozzle member including a sleeve portion surrounding said conduit member, notches on the exterior surface of aid sleeve member adapted to engage with and disengage from said notches on the encompassing member, and means preventing relative longitudinal movement between said sleeve and said conduit member but affording relative rotational movement therebetween, said notches being disengageable by moving said encompassing member longitudinally relative to said conduit member, said notches being again engaged by opposite longitudinal movement of said encompassing member, said means preventing rotation between said conduit member and said encompassing means comprising a non-circular shape for said conduit member, and the bottom wall of said encompassing member being provided with a non-circular opening through which said conduit member extends.

7. A lubricant discharge nozzle comprising a conduit member, a nozzle member disposed at an angle to said conduit member, a sleeve member extending from said nozzle member and lying concentrically over said conduit member, means formed on the outer surface of the concentric portion of said sleeve member adapted to receive meshing means, an encompassing member mounted concentrically with the conduit member and slidably mounted upon the concentric portion of the sleeve member, said encompassing member having a portion adapted to mesh with the means formed on the concentric portion of the sleeve when said encompassing member is in one position and to be out of mesh when said encompassing member is in another position, frictional means interposed between said encompassing member and the concentric portion of the sleeve member tending to oppose but affording sliding movement therebetween, means preventing relative longitudinal movement between the sleeve member and the conduit member but affording relative rotational movement therebetween, and means preventing relative rotational movement between the encompassing member and the conduit member but affording relative longitudinal motion therebetween.

8. A lubricant discharge nozzle comprising a conduit member, a nozzle member disposed at an angle to said conduit member, a sleeve member extending from said nozzle member and lying concentrically over said conduit member, means formed on the outer surface of the concentric portion of said sleeve member adapted to receive meshing means, an encompassing member mounted concentrically with the conduit member, said encompassing member having a portion adapted to mesh with the means formed on the concentric portion of the sleeve when said encompassing member is in one position and to be out of mesh when said encompassing member is in another position, means preventing relative longitudinal movement between the sleeve member and the conduit member but affording relative rotational movement therebetween, means preventing relative rotational movement between the encompassing member and the conduit but affording relative longitudinal motion therebetween, and frictional means cooperating with said encompassing member tending to oppose but affording said relative longitudinal motion, said frictional means providing sufficient friction that only intentional movement of said encompassing member to an engaging or disengaging position is permitted.

9. A lubricant discharge nozzle comprising a conduit member, a nozzle member disposed at an angle to said conduit member, a sleeve member extending from said nozzle member and lying concentrically over said conduit member, means formed on the outer surface of the concentric portion of said sleeve member adapted to receive meshing means, an encompassing member mounted concentrically with the conduit member and slidably mounted upon the concentric portion of the sleeve member, said encompassing member having a portion adapted to mesh with the means formed on the concentric portion of the sleeve when said encompassing member is in one position and to be out of mesh when said encompassing member is in another position, frictional means interposed between said encompassing member and the concentric portion of the sleeve member tending to oppose but affording sliding movement therebetween, said frictional means providing sufficient friction that only intentional movement of said encompassing member to an engaging or disengaging position is permitted, means preventing relative longitudinal movement between the sleeve member and the conduit member but affording relative rotational movement therebetween, means preventing relative rotational movement between the encompassing member and the conduit member but affording relative longitudinal motion therebetween, and means for limiting the extent of sliding motion of said encompassing member.

CHARLES W. GINTER.

REFERENCES CITED

The following references are of record in the file of this patent:

UNITED STATES PATENTS

| Number | Name | Date |
| --- | --- | --- |
| 2,116,004 | Tear | May 3, 1938 |
| 2,135,222 | Scheiwer | Nov. 1, 1938 |
| 2,146,385 | Tear | Feb. 7, 1939 |